UNITED STATES PATENT OFFICE.

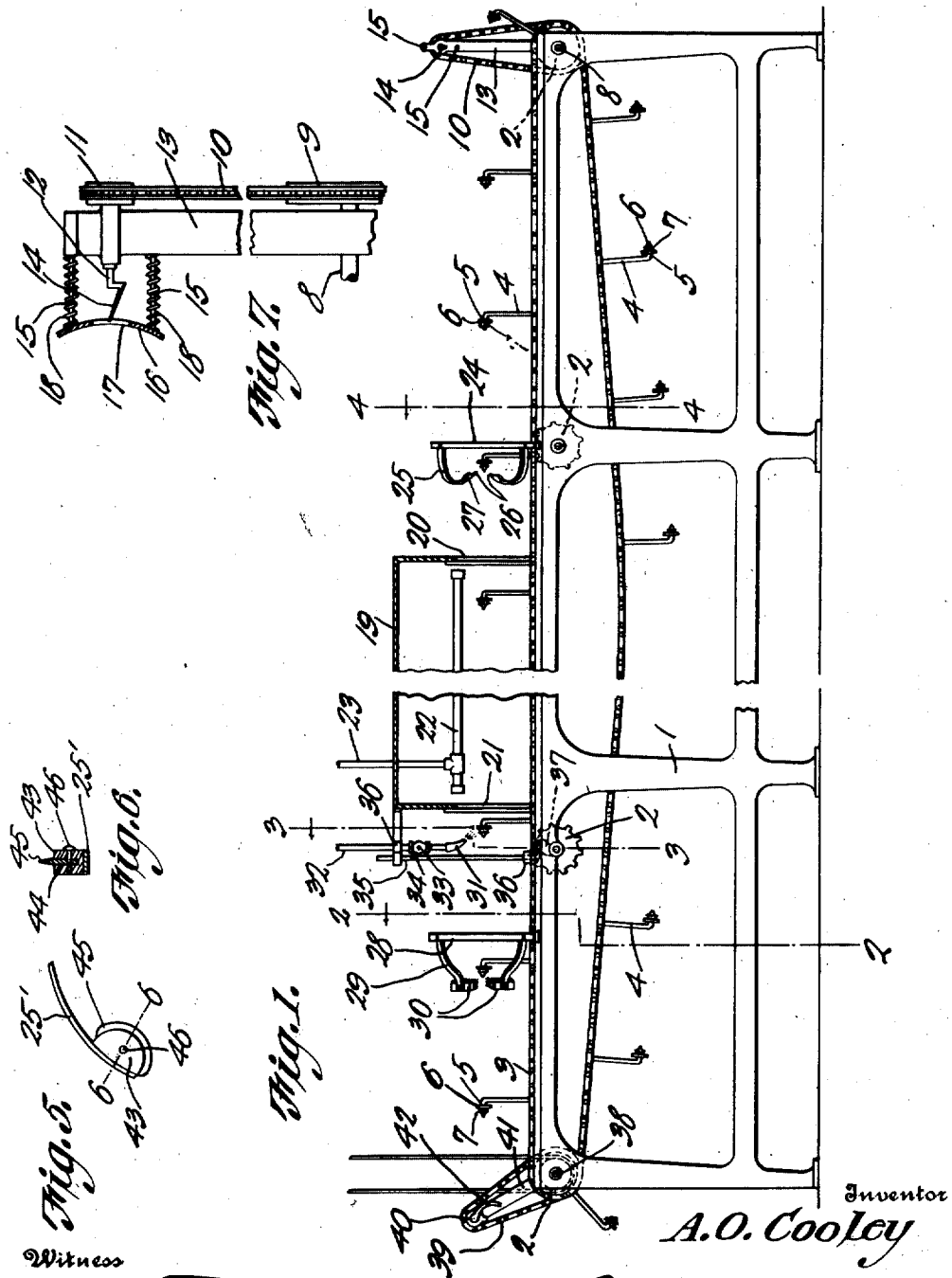
A. O. COOLEY.
MACHINE FOR PEELING TOMATOES.
APPLICATION FILED MAR. 28, 1917.
1,252,322.
Patented Jan. 1, 1918.
2 SHEETS—SHEET 1.
Inventor
A. O. Cooley
By C. A. Snow & Co.
Attorney
Witness

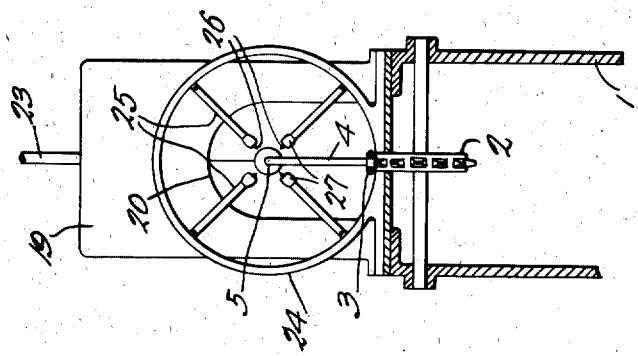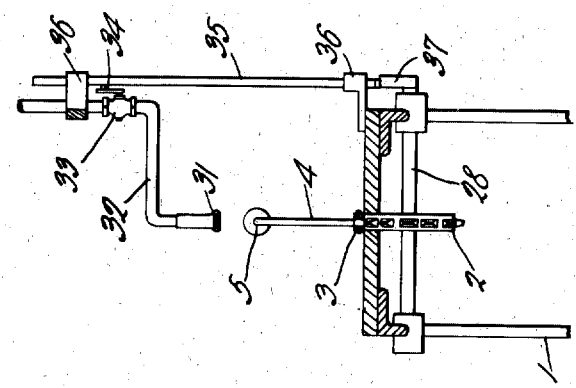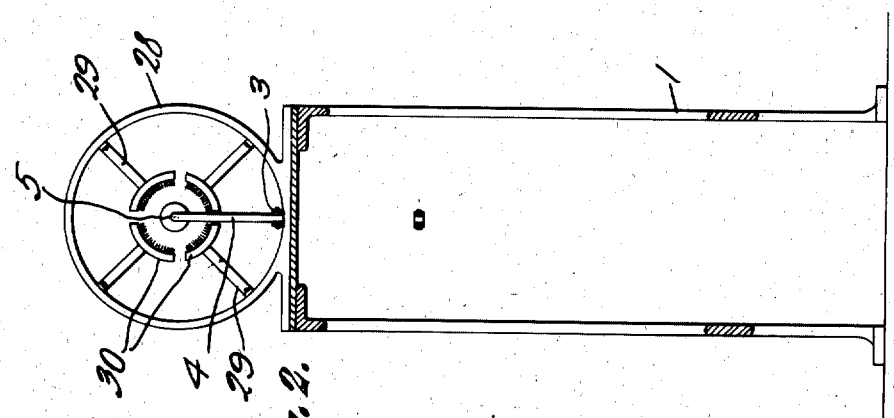

AMBROSE OLIVER COOLEY, OF HAVRE DE GRACE, MARYLAND.

MACHINE FOR PEELING TOMATOES.

1,252,322.   Specification of Letters Patent.   Patented Jan. 1, 1918.

Application filed March 28, 1917. Serial No. 157,994.

*To all whom it may concern:*

Be it known that I, AMBROSE OLIVER COOLEY, a citizen of the United States, residing at Havre de Grace, in the county of Harford and State of Maryland, have invented a new and useful Machine for Peeling Tomatoes, of which the following is a specification.

This invention relates to machines for peeling tomatoes, one of the objects of the invention being to provide a simple and compact machine which will convey tomatoes, after being cored, to scoring knives of novel form which operate to cut the thin skin of each tomato into segments, after which said tomatoes are conveyed to a steaming, washing and brushing apparatus so that the tomatoes are delivered fully peeled, from one end of the apparatus.

A further object is to provide novel means for removing the skin from a tomato without requiring the use of any special mechanism such as gears or the like for operating the skin removing means.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing the preferred form of the invention has been shown.

In said drawings:—

Figure 1 is a vertical longitudinal section through the machine, the middle portion thereof being removed.

Fig. 2 is an enlarged section on line 2—2 Fig. 1.

Fig. 3 is an enlarged section on line 3—3 Fig. 1.

Fig. 4 is a section on line 4—4 Fig. 1, said section being on an enlarged scale.

Fig. 5 is a side elevation of a modified form of knife and holder.

Fig. 6 is a section on line 6—6 Fig. 5.

Fig. 7 is a detail view of a coring device which can be used in connection with the machine.

Referring to the figures by characters of reference 1 designates an elongated supporting frame provided, at intervals, with sprockets 2 on which is mounted an endless conveyer 3 which can be formed of a chain. Arranged on this conveyer at intervals are pins 4 extending perpendicularly from the conveyer and provided at their free ends with fingers 5 projecting at right angles to the pins. Each of these fingers has a conical head 6 provided with small barbs or outstanding prongs 7.

One of the end sprockets 2 on which the conveyer is mounted has a shaft 8 to which is secured an additional sprocket 9 designed to transmit motion through a chain 10 to a sprocket 11 secured to a shaft 12 which is journaled on a standard 13. This shaft 12 is formed with an obliquely disposed knife 14 constituting a coring blade. Pins 15 are slidably mounted in the standard and are connected to a plate 16 in which is provided an opening 17. Springs 18 serve to hold the plate normally pressed away from the standard 13, these springs being mounted on the pins 15. It is to be understood that during the rotation of the shaft 12 and the coring blade 14 a tomato can be placed against the plate 16 with the eyes thereof across the opening 17. By then pressing against the tomato so as to shift the plate 16 toward the standard 13, the eye portion of the tomato will be brought into contact with the blade 14 so that the tomato will thus be quickly and accurately cored.

Extending over the conveyer 3 at an intermediate point is a housing 19 having end openings 20 and 21. This housing contains a nozzle 22 in communication with a steam supply pipe 23. The nozzle is located above the paths of the heads 6.

Arranged between the housing 19 and that end of the machine on which the coring mechanism is mounted, is a substantially circular frame 24 upstanding from and extending transversely of the frame 1, the upper flight of the conveyer being extended through this frame. Extending from the frame and toward the housing are converging bowed spring arms 25 and arranged at the free end of each of these arms is a small cutting blade 26. Adjacent each of these blades is a bearing lug 27. Frame 24 is so positioned that when one of the heads 6 passes therethrough, said head will be in line with the center of the frame and will be equidistant from the blades 26.

Arranged between the housing 19 and the discharge end of the machine is another upstanding substantially circular frame 28 extending transversely of the frame 1. The upper flight of the conveyer 3 extends through this frame 28 and secured to the frame are converging spring arms 29 to the free end of each of which is secured a brush 30. These brushes are preferably arcuate as shown particularly in Fig. 2 and the heads 6 on the pins 4 are adapted to pass through the center of the opening in the frame 28 and also through the center of the circle normally defined by the brushes 30.

Located between the frame 28 and the housing 19 is a washing apparatus including a nozzle 31 supported above the paths of the heads 6 and connected to a supply pipe 32. This supply pipe has a valve 33 which is normally closed and a crank arm 34 is connected to the valve and also to a rod 35 which is slidably mounted in suitable guides 36 provided therefor. This rod rests on a cam 37 secured to the shaft 38 of one of the sprockets 2. The parts are so timed that each time one of the pins 4 is brought to position adjacent the nozzle 31, the cam 37 will shift the rod 35 so as to open valve 33 momentarily after which the valve will be closed.

The sprocket 2 at that end of the frame 1 remote from the standard 13 is mounted on the drive shaft 38 of the apparatus and this drive shaft is also used to drive a chain 39 for operating a shaft 40 mounted on a standard 41. This shaft 40 has a thrower arm 42 attached thereto and designed to engage successively the tomatoes on the heads 6 and to detach them therefrom and discharge them from the machine.

In using the machine, steam is admitted to the housing 19 and the tomatoes are placed on the coring apparatus as described. Each tomato is then placed on one of the heads 6, and it is to be understood that these heads will fit snugly into the recesses cut into tomatoes and the tomatoes wil be held to the heads by the barbs or prongs 7. As each tomato is brought to position in the frame 24 it will be pressed against the knives 26 and will be pushed past the knives, thus causing the arms 25 to bend outwardly but at the same time press the knives into the tomato. The ears or lugs 27 will prevent the knives from cutting too deeply into the tomato and, as a result, the incisions will be but slightly deeper than the thickness of the skin of the tomato. These knives will result in cutting the skin into segments. After the tomato leaves the knife it will pass through the opening 20 into the housing 19 where it will be thoroughly steamed, this resulting in loosening the skin from the pulp of the tomato. As the tomato issues from the opening 21 the valve of the washing mechanism will be operated automatically and a stream of water directed onto the tomato so that it will be thoroughly washed. The tomato will then be conveyed through the frame 28 and against the brushes 30 which will press tightly thereagainst and yield outwardly, the bristles of the brushes engaging the skin and causing it to pull off of the tomato. After leaving the brushes, the tomato will be conveyed into the path of the arm 42 which is traveling in a circle and which will engage the tomato, pull it off of the head 6 and direct it into a container provided therefor.

Importance is attached to the particular mounting of the blades 26 and the brushes 30, whereby the parts are caused to press firmly upon tomatoes of different sizes and will operate efficiently to cut the skin and to remove it from the tomato. If preferred, and as shown in Figs. 5 and 6, the knives may be provided with arcuate edges. In said figures, one of the spring arms or supports has been indicated at 25' and said arm is provided at its free end with a segmental block 43 having a longitudinal slot 44 into which a segmental knife 45 extends. The arcuate edge of the knife is sharpened and said knife can be detachably held in the block 43 by a transverse pin 46 or the like. Obviously, by providing a knife such as shown in Figs. 5 and 6, considerable rocking movement of the knife can take place without varying the depth of the cut into the tomato.

What is claimed is:—

1. In a tomato peeling machine, the combination with spaced structures and a series of resilient members extending from each of said structures and converging along curved lines, of a scoring knife carried by each of the members of one series, a brush carried by each of the members of the other series, and means for conveying a tomato bottom first against and past the knives and brushes successively.

2. In a tomato peeling machine, the combination with spaced structures and a series of resilient members extending from each of said structures and converging along curved lines, of a scoring knife carried by each of the members of one series, a brush carried by each of the members of the other series, means for conveying a tomato bottom first against and past the knives and brushes successively, and a steaming housing interposed between said structures for the reception of a tomato passing from one structure to the other.

3. In a machine for peeling tomatoes, a structure having an opening therein, resilient members extending from the structure and converging along curved lines, a cutting blade carried by each member, means on each member and adapted to have a rolling engagement with the surface of a tomato for limiting the depth of the incision made by each blade, and means for conveying a tomato bottom first against said means and the blade and past the blade.

4. In a machine for peeling tomatoes, a structure having an opening therein, resilient members extending from the structure and converging along curved lines, a cutting blade carried by each member, means on each member for limiting the depth of the incision made by each blade, and means for conveying a tomato bottom first against said means and the blade and past the blade, said means including a conveyer, pins outstanding from the conveyer, and conical tomato engaging heads having their axes at right angles to the pins, each of said heads having tomato engaging prongs.

5. In a machine for peeling tomatoes, the combination with coring mechanism and a kick off mechanism, of a conveyer, heads carried by the conveyer and adapted to fit snugly in recesses produced by the coring mechanism, spaced structures having openings therein through which the conveyer extends, a series of resiliently supported skin engaging elements carried by each structure and in the path of an engaged tomato, and a steaming housing between said structures for the reception of the engaged tomatoes.

6. In a tomato peeling machine, a supporting structure, a series of spring arms extending therefrom and converging toward each other, a cutting blade carried by each arm, means adjacent each blade for limiting the depth of the incision made by the blade, and means for directing a tomato against and past said limiting means and the blades, said means including a conveyer, pins outstanding therefrom, and conical tomato engaging heads extending from the pins at right angles thereto.

7. In a tomato peeling machine, the combination with spaced series of resilient members, the members of each series converging, of a scoring knife carried by each of the members of one series, an arcuate brush carried by each of the members of the other series, means for conveying a tomato bottom first against the scoring knives and brushes successively, and a steaming housing interposed between said series of members for the reception of a tomato passing from one series to the other.

In testimony that I claim the foregoing as my own, I have hereto affixed my signature in the presence of two witnesses.

AMBROSE OLIVER COOLEY.

Witnesses:
GRACE E. CARSINS,
HENRY A. OSBORN, Jr.